(12) United States Patent
Brackley et al.

(10) Patent No.: US 7,717,254 B2
(45) Date of Patent: May 18, 2010

(54) GLASS SHEET GUIDANCE SYSTEM AND METHOD FOR GUIDING GLASS SHEETS

(75) Inventors: Douglas Edward Brackley, Horseheads, NY (US); James William Brown, Painted Post, NY (US); Frank Thomas Coppola, Horseheads, NY (US); David Alan Tammaro, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 23 days.

(21) Appl. No.: 12/156,037

(22) Filed: May 29, 2008

(65) Prior Publication Data

US 2009/0297318 A1 Dec. 3, 2009

(51) Int. Cl.
*B65G 21/20* (2006.01)
(52) U.S. Cl. .................. 198/836.3; 198/626.1
(58) Field of Classification Search ............. 198/836.3, 198/836.4, 626.1, 626.5
See application file for complete search history.

(56) References Cited

U.S. PATENT DOCUMENTS

| | | | |
|---|---|---|---|
| 1,527,676 A | 2/1925 | Eckert | |
| 1,751,712 A | 3/1930 | Owen | |
| 2,709,000 A * | 5/1955 | Bernard et al. | 226/172 |
| 2,905,112 A | 2/1959 | Sevigny | |
| 3,330,196 A | 7/1967 | Chen et al. | |
| 3,425,818 A | 2/1969 | Plumat | 65/182 |
| 3,799,043 A | 3/1974 | Johnson | 93/37 |
| 4,672,172 A | 6/1987 | Pearl | 219/121 |
| 5,322,160 A * | 6/1994 | Markiewicz et al. | 198/836.3 |
| 5,492,216 A * | 2/1996 | McCoy et al. | 198/626.5 |
| 5,492,218 A * | 2/1996 | Falkowski | 198/836.3 |
| 5,927,480 A * | 7/1999 | McCaffrey et al. | 198/836.3 |
| 5,967,295 A * | 10/1999 | Ledingham | 198/836.3 |
| 6,050,396 A * | 4/2000 | Moore | 198/836.3 |
| 6,089,043 A | 7/2000 | Courtemanche et al. | 65/99.1 |
| 6,131,845 A | 10/2000 | Burlingame et al. | 242/476.7 |
| 6,305,528 B1 * | 10/2001 | Leonard | 198/836.3 |
| 6,454,084 B2 * | 9/2002 | Csiki et al. | 198/836.1 |
| 6,681,916 B2 | 1/2004 | Hiroki | 198/347.1 |
| 7,500,552 B2 * | 3/2009 | Switzeny | 198/686 |
| 2003/0085104 A1 * | 5/2003 | Falkowski | 198/836.3 |
| 2003/0164280 A1 * | 9/2003 | Delaporte et al. | 198/836.3 |
| 2005/0103055 A1 | 5/2005 | Gfeller et al. | 65/112 |
| 2005/0269187 A1 * | 12/2005 | Jenkins et al. | 198/626.5 |
| 2008/0110205 A1 | 5/2008 | Adriaansen et al. | 65/29.12 |

FOREIGN PATENT DOCUMENTS

GB 1416727 12/1972
KR 10-2005-0038134 4/2005

* cited by examiner

*Primary Examiner*—Mark A Deuble
(74) *Attorney, Agent, or Firm*—Jeffrey A. Schmidt

(57) ABSTRACT

A glass sheet guidance system includes a guidance member (22) having a small contact area with the glass sheet (12) and being taut to provide guidance to the glass sheet. In order to provide consistent guidance, even in environments where there is a large change in temperature, the guidance member is held taut by a tension member (24). The guidance member is supported by holders (10) so that, while remaining taut, the guidance member can be moved in three dimensions so as to accommodate glass sheets having different widths (1), heights (2), and thicknesses (3). Also, there is provided a method of guiding glass sheets with the guidance system.

19 Claims, 9 Drawing Sheets

GLASS SHEET GUIDANCE SYSTEM AND METHOD FOR GUIDING GLASS SHEETS

BACKGROUND

The field of the present invention is directed to a system and method for guiding glass sheets and, more particularly for guiding glass sheets as used in making display devices.

TECHNICAL BACKGROUND

In order to move glass sheets, such as large glass sheets used in the manufacture of display devices, such as LCDs, current systems use overhead conveyors with clamps, air bearings and bottom edge conveyors with back side air bearings. With such devices, it is difficult to guide glass sheets of different sizes, while using only a small area of the sheet for guidance. Additionally, the environment in which glass sheets are conveyed may include large variations in temperature, which presents further challenges in guiding glass sheets.

SUMMARY

The presently disclosed glass sheet guidance system is capable of improving guidance of glass sheets. The guidance system provides consistent guidance to glass sheets of varying sizes, even when subject to environments in which there is a large change in temperature.

In one embodiment, the guidance system includes a guidance member that may be a wire, a cable, or a ribbon member, having a small contact area with the glass sheet and being taut to provide guidance to the glass sheet. In environments wherein there is a large change in temperature, the guidance member itself may be subject to variation in its characteristics. More specifically, for example, the length of the guidance member may change as its temperature changes. For example, when temperature of the guidance member increases, the guidance member may get longer. Conversely, when the temperature of the guidance member decreases, the guidance member may get shorter.

In order to provide consistent guidance, even in environments where there is a large change in temperature, the guidance member is held taut by, for example, a tension member. The tension member compensates for the change in length of the guidance member so as to maintain the guidance member in a taut condition.

Further, the guidance member is supported so that, while remaining taut, the guidance member can be moved in three dimensions so as to accommodate glass sheets having different widths, heights, and thicknesses.

According to one aspect, there is provided a glass sheet guidance system including a guidance member, a first holder, and a second holder. The guidance member is coupled to the first holder and the second holder so that the guidance member is taut and is movable in three dimensions.

According to another aspect, the guidance member is coupled to the first holder by a tension member.

According to another aspect, the tension member is a spring.

According to another aspect, the guidance member is a wire, a cable, or a ribbon member.

According to another aspect, the first holder further includes a first housing coupled to the guidance member, a longitudinal adjustment mechanism, a vertical adjustment mechanism, and a horizontal adjustment mechanism. The longitudinal adjustment mechanism is coupled to the first housing so as to dispose the first housing in different positions in a longitudinal direction of the conveyance path thereby making the guidance member movable in a first of the three dimensions. The vertical adjustment mechanism coupled to the first housing so as to dispose the first housing in different positions in a vertical direction, wherein the vertical direction is substantially perpendicular to the longitudinal direction thereby making the guidance member movable in a second of the three dimensions. The horizontal adjustment mechanism coupled to the first housing so as to dispose the first housing in different positions in a horizontal direction, wherein the horizontal direction is substantially perpendicular to the vertical direction and the longitudinal direction thereby making the guidance member movable in a third of the three dimensions.

According to another aspect, the horizontal adjustment mechanism is a powered adjustment mechanism.

According to another aspect, the first holder further includes a sensor for determining a horizontal position of the first housing and outputting a signal based on the horizontal position. The system further includes a controller coupled to the sensor and to the horizontal adjustment mechanism. The controller adjusts the horizontal position of the housing by outputting a signal to the horizontal adjustment mechanism, wherein the signal output from the controller is based on the signal output from the sensor.

According to another aspect, the horizontal adjustment mechanism is a linear force actuator. The system further includes a controller coupled to the linear force actuator so as to cause the linear force actuator to maintain a constant position of, or apply a constant force to, the first housing.

According to another aspect, the system further includes a second guidance member, a third holder, and a fourth holder. The second guidance member is coupled to the third holder and the fourth holder so that the second guidance member is taut and is movable in three dimensions. Also, the second guidance member is opposed to the first guidance member so as to define a gap.

According to another aspect, the third holder further includes a second housing coupled to the second guidance member, a second width adjustment mechanism, a second vertical adjustment mechanism, and a second horizontal adjustment mechanism. The second width adjustment mechanism is coupled to the second housing so as to dispose the second housing in different positions in the longitudinal direction thereby making the second guidance member movable in a first of the three dimensions. The second vertical adjustment mechanism is coupled to the second housing so as to dispose the second housing in different positions in the vertical direction thereby making the second guidance member movable in a second of the three dimensions. The second horizontal adjustment mechanism is coupled to the second housing so as to dispose the second housing in different positions in the horizontal direction thereby making the second guidance member movable in a third of the three dimensions.

According to another aspect, the system may include three holders coupled to one guidance member, the holders being disposed so that the guidance member forms a curve.

According to another aspect, there is provided a method of guiding a glass sheet. The method includes providing a first holder, a second holder, and a guidance member. The guidance member is coupled to the first holder and to the second holder so that the guidance member is taut and movable in three dimensions. The method further includes abutting a glass sheet to the guidance member, and moving the glass sheet relative to the guidance member.

According to another aspect, the method further includes providing a third holder, a fourth holder, and a second guidance member, wherein the second guidance member is coupled to the third holder and to the fourth holder so that the second guidance member is taut and movable in three dimensions. Also, the second guidance member is opposed to the first guidance member so as to define a gap. The method then further includes moving the glass sheet through the gap and relative to the second guidance member.

According to another aspect, additional holders are coupled to each guidance member, and are positioned so that each guidance member forms a curve. The method then further includes passing the glass sheet through the gap so as to follow the curves of the guidance members.

According to another aspect, the method further includes adjusting the first holder so as to push the guidance member into contact with the glass sheet and to maintain a constant force on the glass sheet.

It is to be understood that both the foregoing general description and the following detailed description are merely exemplary of concepts and principles of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain the principles and operation of the invention.

DETAILED DESCRIPTION

Figure 1:
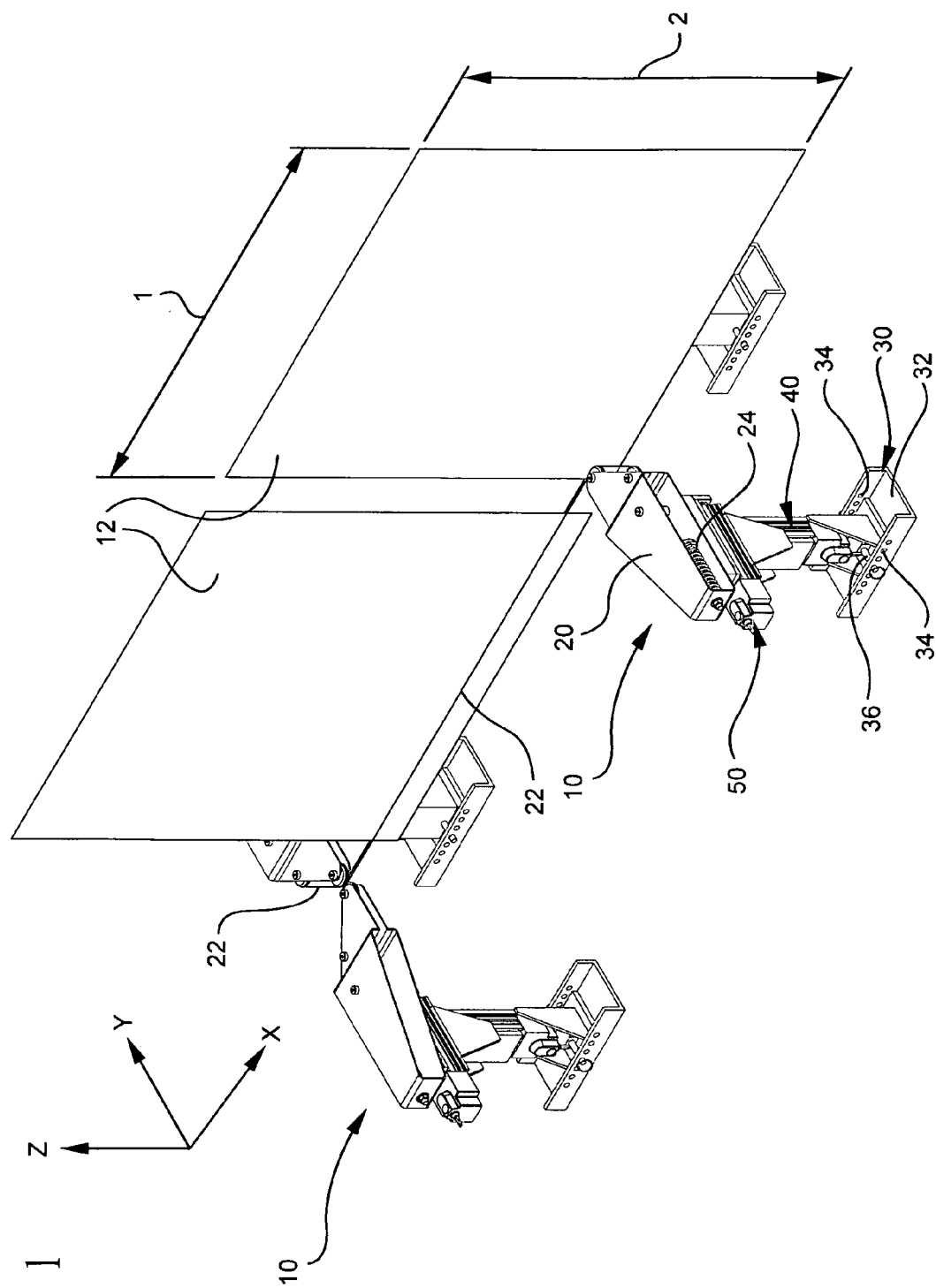
FIG. 1 is a plan view of a glass sheet guidance system according to one embodiment.

In the following detailed description, for purposes of explanation and not limitation, example embodiments disclosing specific details are set forth to provide a thorough understanding of the principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the principles of the present invention. Finally, wherever applicable, like reference numerals refer to like elements.

A glass sheet guidance system is disclosed that is capable of providing consistent guidance to glass sheets even in environments wherein there is a large change in temperature. Additionally, the guidance system can adjust so as to provide consistent guidance to glass sheets of different width, height, and thickness.

In one embodiment, the guidance system includes a guidance member that may be a wire, a cable, or a ribbon member, contacting the glass sheet and being taut to provide guidance to the glass sheet. In an environment wherein there is a large change in temperature, the guidance member itself may be subject to variation in its characteristics. More specifically, for example, the length of the guidance member may change as its temperature changes. For example, when temperature of the guidance member increases, the guidance member may get longer. Conversely, when the temperature of the guidance member decreases, the guidance member may get shorter.

In order to provide consistent guidance, even in environments where there is a large change in temperature, the guidance member is held taut by, for example, a tension member. The tension member compensates for the change in length of the guidance member so as to maintain the guidance member in a taut condition.

Further, the guidance member is supported so that, while remaining taut, the guidance member can be moved in three dimensions so as to accommodate glass sheets having different widths, heights, and thicknesses.

Figure 2:
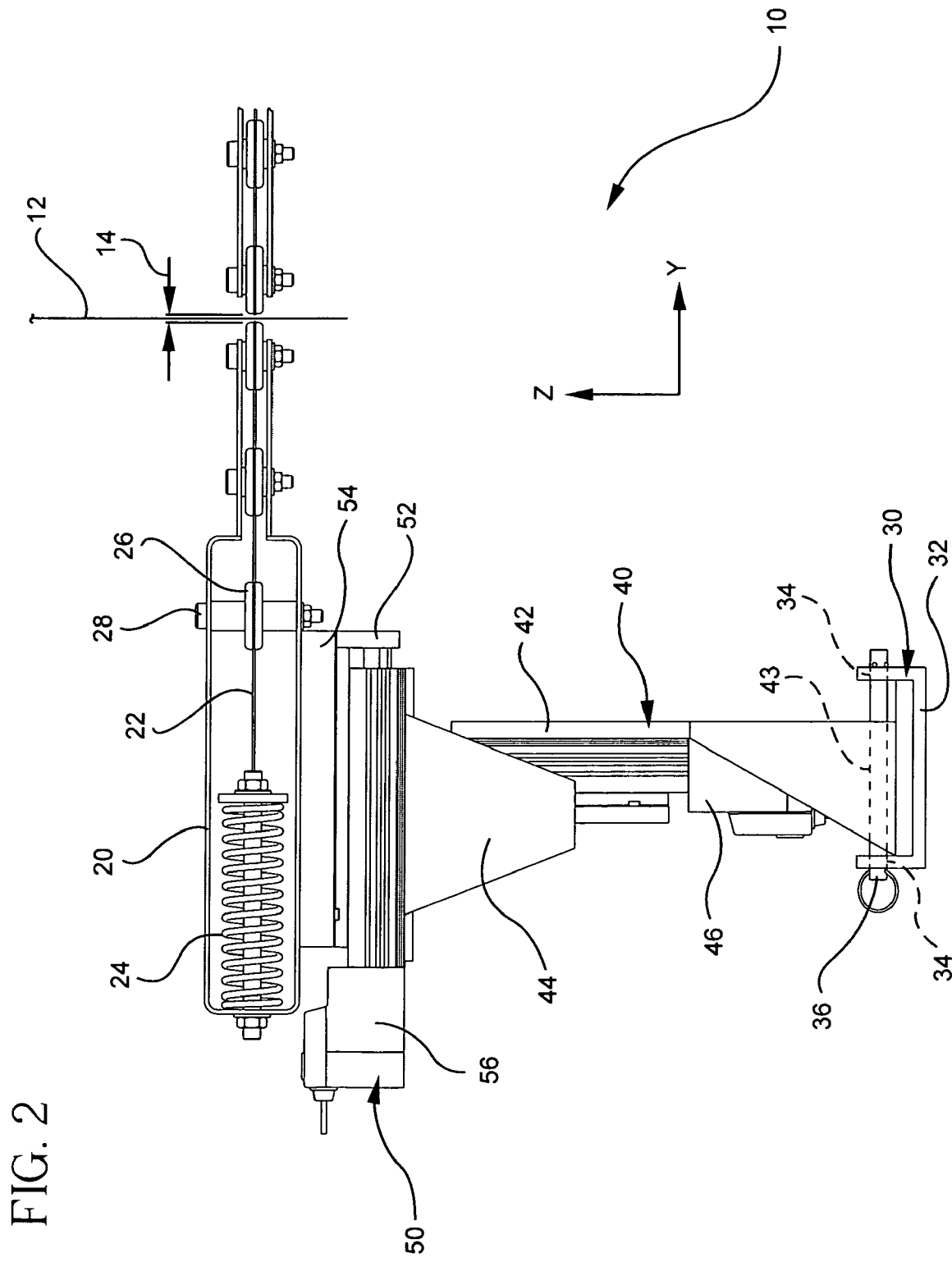
FIG. 2 is a side view of a holder according to the embodiment of FIG. 1.
Figure 3:
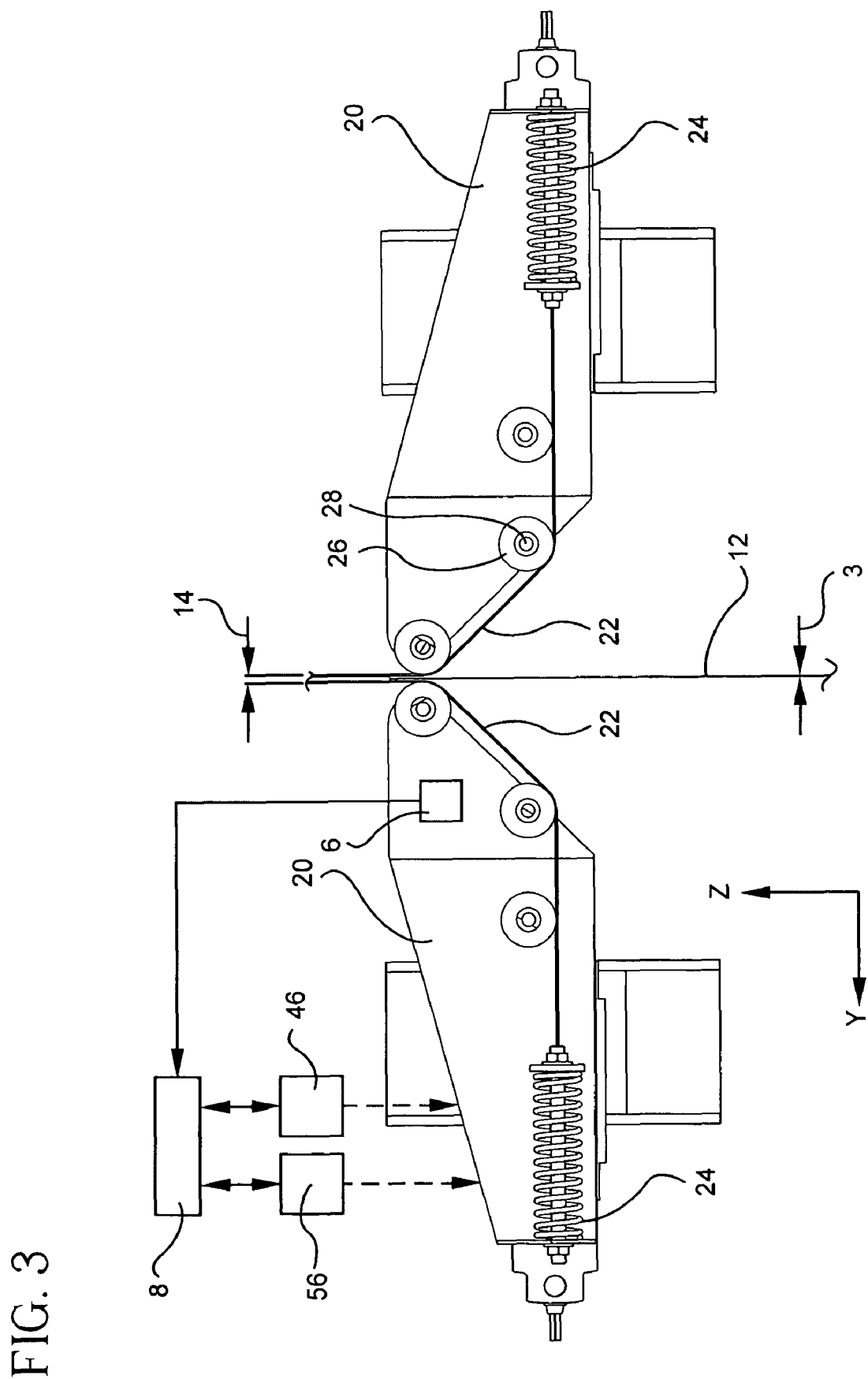
FIG. 3 is a top view of housings on opposite sides of a glass sheet.

FIGS. 1-3 show a first embodiment of a glass sheet guidance system. Referring to FIG. 1, a glass sheet 12 has a width 1, a height 2, and a thickness 3, and travels along a conveyance path in the x-axis direction. The glass sheet 12 may be any type of glass sheet such as one used in LCD or other display manufacture.

On each side of a glass sheet 12, there is disposed a plurality of holders 10. A first set of holders 10 is disposed on one side of the glass sheet 12, and a guidance member 22 is coupled between them so as to abut one side of the conveyance path. A second set of holders 10 is disposed on the other side of the glass sheet 12, and another guidance member 22 is coupled between them to abut a second side of the conveyance path. The first and second sets of holders are disposed so that the guidance members 22 form a gap 14 therebetween for guiding the glass sheet 12. The gap 14 defines a width of the conveyance path for the glass sheet 12.

The guidance member 22 in this embodiment is a wire or cable, which has a small contact area with the glass sheet 12. If a cable, the guidance member 22 may be braided or otherwise stranded. The material from which the guidance member 22 is made is not particularly restricted, and will vary depending on the application of the glass sheet guidance system. That is, if the glass sheet 12 to be guided is at a high temperature, then the guidance member can be made of a heat resistant material. The guidance member may be metal or non-metal, and may have a coating (such as Teflon® for example) so as to reduce friction with the glass sheet and, thereby, reduce the possibility of the guidance member damaging the glass sheet as they move relative to one another. Alternatively, or in addition thereto, the material of the guidance member itself can be chosen so as not to damage the surface of the glass sheet. The cross-sectional shape of the guidance member 22 is not particularly restricted, and may be circular, oval, or square, for example, and still maintain a small contact area with the glass sheet 12.

Each of the holders 10 includes a housing 20 that supports the guidance member 22 so that the guidance member 22 remains taut even when subject to large temperature changes. Further, the holder 10 supports the guidance member 22 so that it is movable in three dimensions, while remaining taut.

The guidance member 22 may be coupled to the housing 20 by a tension member 24. The tension member 24 keeps the guidance member 22 taught even during large changes in temperature. More specifically, the length of the guidance member 22 may change when its temperature changes. For example, when temperature of the guidance member 22 increases, the guidance member 22 may get longer. Conversely, when the temperature of the guidance member 22 decreases, the guidance member 22 may get shorter. The tension member 24 can compensate for the change in length of the guidance member 22 so as to maintain the guidance member 22 in a taut condition. The amount of change in length of the guidance member 22, and whether the length increases or decreases with an increase in temperature, depends upon the coefficient of thermal expansion of the material from which the guidance member is made.

In order to accommodate the change in length of the guidance member 22 while keeping the guidance member 22 taut, the tension member 24 may be a spring, for example. When the tension member 24 is a spring, the spring can be coupled to the guidance member 22 so as to extend to accommodate a decrease in length of the guidance member 22. On the other hand, the spring can be coupled to the guidance member 22 so as to contract to accommodate an increase in length of the guidance member 22. In such a manner, the guidance member 22 will remain taut, even when undergoing changes in length due to changes in temperature. Although a coil spring is shown, other types of springs may be used.

Only one holder 10 in a set may include a tension member 24 or, alternatively, the holders at opposite ends of a guidance member 22 may both include a tension member 24. The tension member 24 is chosen so that a sufficient amount of force is applied to the guidance member 22 to make it taught between the holders 10 so that the guidance member 22 can resist movement of the glass sheet 12 in the y-axis direction. Additionally, as noted above, the tension member 24 accommodates changes in length of the guidance member 22 due to temperature variation, or otherwise, while keeping the guidance member 22 taut. Alternative mechanisms for the tension member 24 include a pneumatic or hydraulic piston-cylinder arrangement, or a hanging weight system.

The holders 10 of the first set support the guidance member 22 so that it is movable in three dimensions, namely, in the x, y, and z-axis directions shown in FIG. 1. Similarly to the holders 10 of the first set, the holders 10 of the second set support the guidance member 22 so that it is movable in three dimensions, namely, in the x, y, and z-axis directions shown in FIG. 1. The housing 20 supports the guidance member 22 so that the guidance member 22 remains taut when moved in three dimensions. Because the guidance members 22 are movable in three dimensions, the glass sheet guidance system can be adjusted to accommodate glass sheets 12 having different width 1, height 2, and thickness 3.

The number and arrangement of the holders 10 can vary. For example, although only two holders 10 are shown as being connected to a guidance member 22, any suitable number of holders 10 may be used in a set connected to one guidance member 22. Also, depending on the distance that the glass sheet 12 is to travel for a given application of the glass sheet guidance system, more than one set of holders 10 may be disposed in series along the x-axis direction on each side of the conveyance path for the glass sheet 12. For example, a third set of holders 10 may be disposed on the same side of the conveyance path for the glass sheet 12 as the first set of holders, and downstream of the first set of holders in the x-axis direction. Additionally, a fourth set of holders 10 may be disposed on the same side of the conveyance path for the glass sheet 12 as the second set of holders, and downstream of the second set of holders in the x-axis direction. Similarly to the first and second sets of holders 10; the third and fourth sets of holders 10 may be disposed so as to form a gap for guiding the glass sheet 12, wherein the gap defines the width of the conveyance path for the glass sheet 12. Further, any number of sets of holders 10 may be used on one side of the conveyance path for the glass sheet 12. Moreover, the same or a different number of sets of holders 10 may be used on opposite sides of the conveyance path for the glass sheet 12.

Alternatively, a set of holders 10 may be used on only one side of the conveyance path for the glass sheet 12 without a corresponding set of holders 10 on the opposite side of the conveyance path for the glass sheet 12. In such a case, there is no gap associated with that particular set of holders 10. In this alternative case, the guidance system would resist motion of the glass sheet from one side at the point along the x-axis at which that set of holders is disposed. Further, a number of these sets of holders may be disposed along the x-axis on one side of the conveyance path for the glass sheet 12. Moreover, a number of these sets of holders (used without a corresponding set of holders so that there is no gap formed) may be used on opposite sides of the conveyance path for the glass sheet at different x-axis positions. For example, one set of these holders (used without a corresponding set of holders so that there is no gap formed) may be used on a first side of the conveyance path for the glass sheet 12 at a first x-axis position. Then, another set of these holders (used without a corresponding set of holders so that there is no gap formed) may be used on a second side of the conveyance path for the glass sheet 12 at a different x-axis position.

FIG. 2 shows a side view of one holder 10 according to one embodiment. As noted above, the holder 10 includes the housing 20 that supports the guidance member 22. Within the housing 20, the guidance member 22 is positioned by a plurality of bearing members 26 that are mounted to the housing 20 with posts 28. The bearing members 26 may be rollers, or stationary members. To support the housing 20, the holder 10 further includes a floor support 30, a vertical support 40, and a horizontal support 50. The floor support 30, vertical support 40, and horizontal support 50 are configured so as to provide movement to the housing 20, and thus to the guidance member 22, in three dimensions.

The floor support 30 includes a U-shaped plate 32 having a plurality of holes 34 in each leg of the U. The holes 34 in one leg are paired with the holes 34 in the other leg, so as to provide a series of pairs of holes along the x-axis direction. A pair of holes includes a hole 34 in one leg and a hole 34 in the other leg, wherein the holes 34 are aligned in the x-axis direction. A pin 36 may be inserted in any pair of holes 34. The pin 36 locates the vertical support 40 with respect to the floor support 30, and serves as a longitudinal adjustment mechanism in connection with the holes 34. The longitudinal adjustment mechanism provides for movement of the housing 20, and thus the guidance member 22, in the x-axis direction.

Vertical support 40 includes a lower section 42, an upper section 44, and an actuator 46 coupled therebetween. The lower section 42 includes a hole 43 that can be aligned with the various pairs of holes 34 in the plate 32. Accordingly, the pin 36 can be inserted through one hole 34, through the hole 43, and through another hole 34 to thereby locate the vertical support 40 with respect to the floor support 30, as noted above. In this embodiment, the actuator 46 is a powered actuator such as, for example, a hydraulic or pneumatic piston-cylinder arrangement, an electric motor, or a linear force actuator as available from SMAC of Carlsbad, Calif. A linear force actuator has a sensing device therein, and can be operated so as to maintain a constant position, or so as to apply a constant force. The actuator 46 is coupled to the lower section 42 and upper section 44 so as to move the lower section 42 and the upper section 44 relative to one another in the z-axis direction and, thus, acts as a vertical adjustment mechanism. The vertical adjustment mechanism provides for movement of the housing 20, and thus the guidance member 22, in the z-axis direction.

Horizontal support 50 includes a slide 52, a block 54, and an actuator 56. The block 54 couples the housing 20 to the slide 52. In this embodiment, the block 54, housing 20, and slide 52 do not move relative to one another. The actuator 56 is coupled to the slide 52 and to the upper section 44 of the vertical support 40. Similarly to the actuator 46 of the vertical support 40, the actuator 56 of the horizontal support 50 in this embodiment is a powered actuator such as, for example, a hydraulic or pneumatic piston-cylinder arrangement (for example, wherein a cylinder may be coupled to upper section 44, and a piston disposed within the cylinder is coupled to slide 52), an electric motor, or a linear force actuator as available from SMAC of Carlsbad, Calif. A linear force actuator has a sensing device therein, and can be operated so as to maintain a constant position, or so as to apply a constant force. The actuator 56 moves the slide 52, and thus the housing 20 and guidance member 22, relative to the upper section 44 and along the y-axis direction, and thus acts as a horizontal adjustment mechanism.

FIG. 3 schematically shows an arrangement for controlling the position of the housing 20 and, thereby, the position of the guidance member 22. A controller 8 is coupled to actuators 46, 56, and to a sensor 6.

The controller 8 may be a general or special purpose computer, for example. The controller 8 receives input from the sensor 6, and may receive input from actuators 46 and/or 56, as when they are linear force actuators. The controller 8 also provides input to the actuators 46 and/or 56 to manipulate them in a desired manner. Although the controller 8 is shown as being coupled to the actuators 46 and 56 of one housing 20, the controller 8 may be coupled to the actuators 46, 56 of any number of housings 20 that are present in the glass sheet guidance system.

The actuators 46, 56, are shown schematically in FIG. 3 as being coupled with the housing 20. For the arrangements of the actuators, and how they are mechanically coupled to the other elements of the sheet guidance system, reference is made to the other figures of the application and the associated description.

The sensor 6 may be used as an alternative to a linear force actuator, or in addition thereto. The sensor 6 may be disposed on the housing 20 so as to detect position of the housing either relative to the glass sheet 12, relative to another housing, or relative to another point of reference, for example. The sensor 6 then provides the position information to the controller 8. The sensor 6 may be a confocual laser gage as is available from Keyence Corporation of America, Woodcliff Lake, N.J. The sensor 6 may be used in connection with a linear force actuator to increase accuracy of the position of the housing 20. A sensor 6 may be disposed in only one housing 20 of a set of holders 10, or may be disposed in each housing 20 of a set of holders 10. Similarly, a sensor 6 may be disposed in only one set of holders 10, or may be used in more than one set of holders 10.

The holders 10 within each set may have the same configuration as one another, or may have different configurations. Similarly, the holders 10 of one set may have the same configuration as the holders of a second set, or may have different configurations.

The glass sheet guidance system of the first embodiment operates as follows.

A glass sheet 12 is moved along a conveyance path in the x-axis direction so that the glass sheet 12 is disposed in the gap 14 between the guidance members 22. The glass sheet 12 may be moved by a conveyor system coupled to the top of the glass sheet 12 by clamps, for example. However, the specific conveyance mechanism is not particularly limited. A plurality of glass sheets 12 can be moved along the conveyance path through the guidance system in series, i.e., one following another along the conveyance path in the x-axis direction. As a glass sheet 12 travels along the conveyance path in the x-axis direction, it is guided by, and moves relative to, the guidance members 22. The guidance members 22 resist motion of the glass sheet 12 in the y-axis direction.

The length and/or position of the guidance member 22 can be adjusted so as to accommodate glass sheets 12 having different width 1, height 2, and thickness 3.

In order to accommodate glass sheets having a different width 1, the length of the guidance member 22 available to guide the glass sheet 12, i.e., the length of the guidance member 22 between housings 20 of one set of holders 10, can be adjusted. In order to change this length of the guidance member 22, the position of the housings 20 in the x-axis direction can be adjusted. To guide a glass sheet 12 having a larger width 1, the housings 20 in each set may be moved away from one another in the x-axis direction. To guide a glass sheet 12 having a smaller width, the housings 20 in each set may be moved towards one another in the x-axis direction.

The position of the housings 20 along the x-axis can be adjusted by, for example, the longitudinal adjustment mechanism. As described above, the longitudinal adjustment mechanism includes pin 36 and holes 34 in the plate 32 of the floor support 30. The pin extends through one hole 34, through the hole 43 in the lower section 42 of the vertical support 40, and then through another hole 34. By moving the pin 36 between different pairs of holes 34, the vertical support 40 can be located in different positions in the x-axis direction. Because the housing 20 is coupled to the vertical support 40, the housing 20 also is located in different positions in the x-axis direction. Moving the housings 20 in one set of holders in the x-axis direction, allows the distance between the housings 20 to be adjusted to best accommodate the width 1 of the glass sheets 12.

Alternatively to moving two housings 20 in one set of holders, only one of the housings 20 may be moved relative to the other housings 20 in the set. Further, the position of the guidance member 22 may be moved along the x-axis by moving the housings 20 in one set in the same direction along the x-axis.

When adjusting the position of the housings 20 in the x-axis direction, the tension member 24 may be sufficient to compensate for the change so that a guidance member 22 having a different length is not necessary. Alternatively, when adjusting the position of the housing 20 in the x-axis direction, guidance members 22 having different lengths may be used. For example, when moving the housings 20 of one set away from one another in the x-axis direction, a longer guidance member 22 may be used. Conversely, when moving the housings 20 of one set toward one another in the x-axis direction, a shorter guidance member 22 may be used.

In order to guide glass sheets 12 having a different height 2, the position of the guidance member 22 along the z-axis can be changed. That is, the glass sheets 12 may hang from and be moved by a conveyor attached at the top of the glass sheet 12, wherein the conveyor is a fixed distance above the floor support 30. Accordingly, to guide glass sheets 12 having different heights 2, the z-axis position of the guidance member 22 above the floor support 30 can be adjusted.

To change the z-axis position of the guidance member 22, the z-axis positions of the housings 20 supporting that guidance member 22 are changed. The z-axis position of each housing 20 can be changed by, for example, the vertical adjustment mechanism, including actuator 46. The actuator 46 can change the z-axis positions of the upper 44 and lower 42 sections of the vertical support 40 relative to one another and, thereby, adjust the z-axis position of the housing 20 coupled to the vertical support 40. For example, when the actuator 46 moves the upper 44 and lower 42 sections away from one another, the housing 20 moves upwards in the z-axis direction. Conversely, when the actuator moves the upper 44 and lower 42 sections toward one another, the housing 20 moves downwards in the z-axis direction. Thus, by moving the housings 20 in one set of holders upwards or downwards, the z-axis position of the guidance member 22 is also moved upwards or downwards.

The actuators 46 in the holders 10 of one set may be controlled separately. Accordingly, the z-axis position of the housings 20 in the holders 10 one set of may be separately adjusted, and may be adjusted by the same or different amounts. Alternatively, the actuators 46 in the holders 10 of one set may be controlled together so as to move the housings 20 in the one set by the same amount.

The actuators 46 of the holders 10 in the first and second sets may be separately operable so that the guidance members 22 on opposite sides of the glass sheet 12 may be located at the same, or different, z-axis positions. Alternatively, the actuators 46 of the holders 10 in the first and second sets may be controlled together so as to maintain a corresponding z-axis position of the guidance members 22 in the first and second sets of holders 10.

In order to guide glass sheets 12 having a different thickness 3, the positions of the guidance members 22 on opposite sides of the conveyance path for the glass sheet 12 are changed in the y-axis direction. Generally, the gap 14 is set to be substantially equal to, or larger than, the thickness 3. Therefore, to guide glass sheets having a larger thickness 3, the gap 14 is increased by moving the guidance members 22 away from one another in the y-axis direction. Similarly, to guide glass sheets 12 having a smaller thickness 3, the gap 14 is reduced by moving the guidance members 22 toward one another in the y-axis direction. The guidance members 22 may be moved toward or away from one another by moving either one or both of the guidance members 22.

To change the y-axis position of the guidance member 22, the y-axis positions of the housings 20 supporting that guidance member 22 are changed. The y-axis position of each housing 20 can be changed by, for example, the horizontal adjustment mechanism, including actuator 56. The actuator 56 is coupled to the upper section 44 and to the slide 52 so as to move the slide 52 (and the housing 20 coupled to the slide 52) back and forth along the y-axis direction.

The y-axis position of the guidance member 22 may be changed so as to maintain a constant gap 14, or so as to maintain a constant force on the glass sheet 12. The actuator 56 can be controlled to maintain a constant size of the gap 14 by maintaining the y-axis position of the housing 20. Further, when using a linear force actuator (including a pressure sensor) as the actuator 56, the housing 20 can be continuously urged toward the glass sheet in the y-axis direction so as to cause the guidance member 22 to contact the glass sheet 12 and maintain a constant force on the glass sheet 12.

The powered actuators in this embodiment, or in other embodiments, may be controlled by the controller 8 so as to provide for either automatic or manual adjustment.

For automatic adjustment, a linear force actuator may be used for the actuator 56, and controller 8 may control the linear force actuator so as to maintain a constant position, or to apply a constant force. More specifically, the controller 8 may cause the linear force actuator to maintain the housing 20 in a constant position, thereby maintaining a constant gap 14. Alternatively, the controller 8 may cause the linear force actuator to apply a constant force to the housing 20 in the y-axis direction, based on the sensing capability of the linear force actuator. Then, due to the constant force applied to the housing 20 by the linear force actuator, the guidance member 22 in turn applies a constant force to the glass sheet 12, as the glass sheet moves relative to the guidance member 22.

As an alternative to the linear force actuator, or in addition thereto, a sensor 6 may be used as an input to the controller 8. The sensor 6 may be disposed on the housing 20 so as to detect the position of the housing either relative to the glass sheet 12, relative to another housing, or relative to another point of reference, for example. Then, based on the output of the sensor 6, and the desired control function, controller 8 may provide a signal to manipulate the actuator 56 so as to maintain the housing 20 at a constant position and, thereby, maintain a constant gap 14. The sensor 6 may be used in connection with a linear force actuator to increase accuracy of the position of the housing 20.

In a manual mode, the controller 8 may be used simply as an input to set the position of the housing 20, and thus of the guidance member 22, by controlling the actuators 46 and 56.

As described above, the glass sheet guidance system can be used to guide glass sheets where a continuous manufacturing process is used, such as in printed electronics on glass substrates. Additionally, the glass sheet guidance system could be used in all areas of glass sheet manufacture, such as LCD glass manufacturing including the areas of forming, inspecting, finishing, or packaging, i.e., anywhere glass sheet guidance is beneficial. Further, the glass sheet guidance system may be used in a process for continuously removing edge beads from a glass sheet, wherein the guidance system would assist in directing the edge bead portion away from the glass sheet itself.

Figure 4:
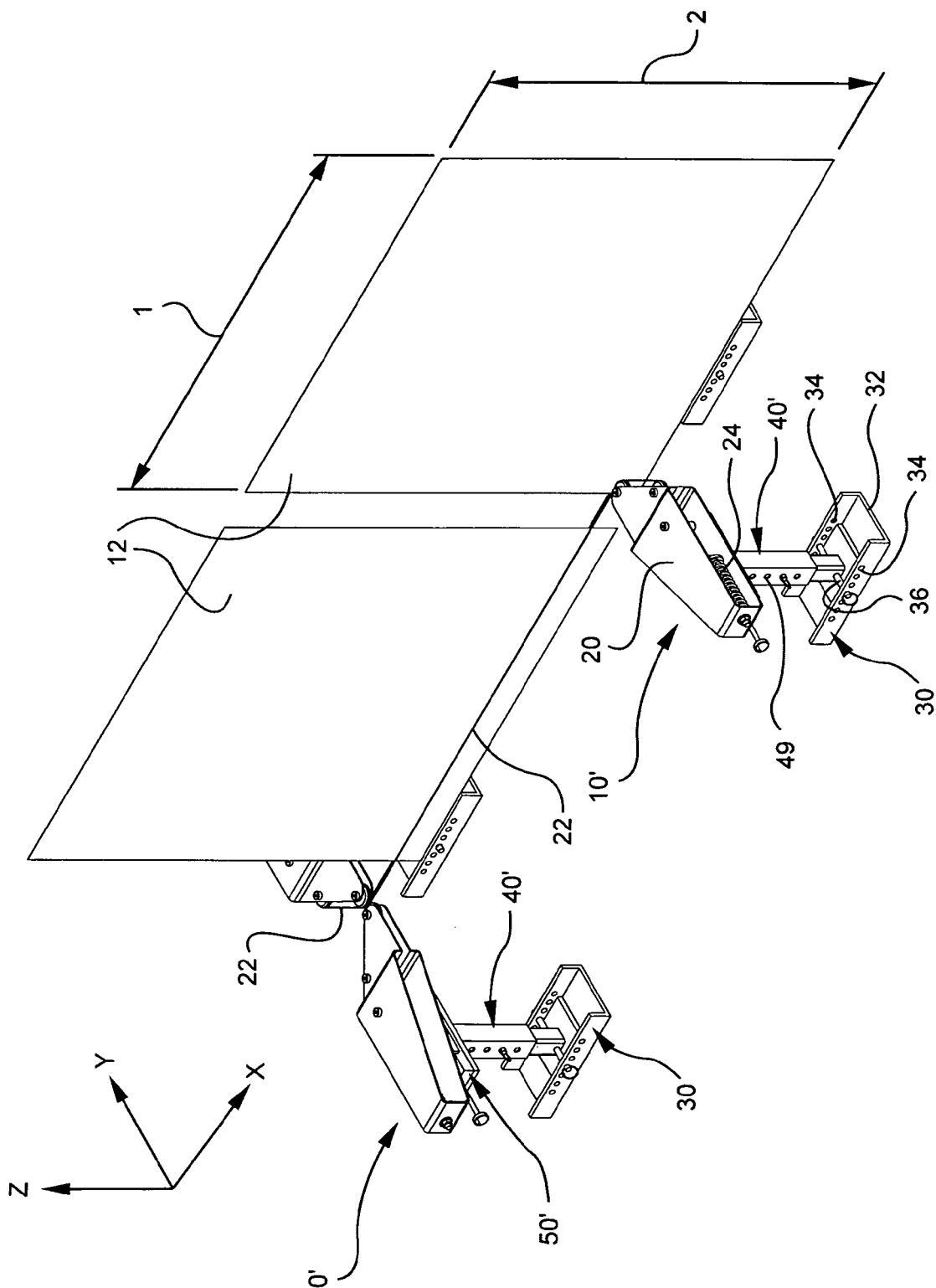
FIG. 4 is a plan view of a glass sheet guidance system according to a second embodiment.
Figure 5:
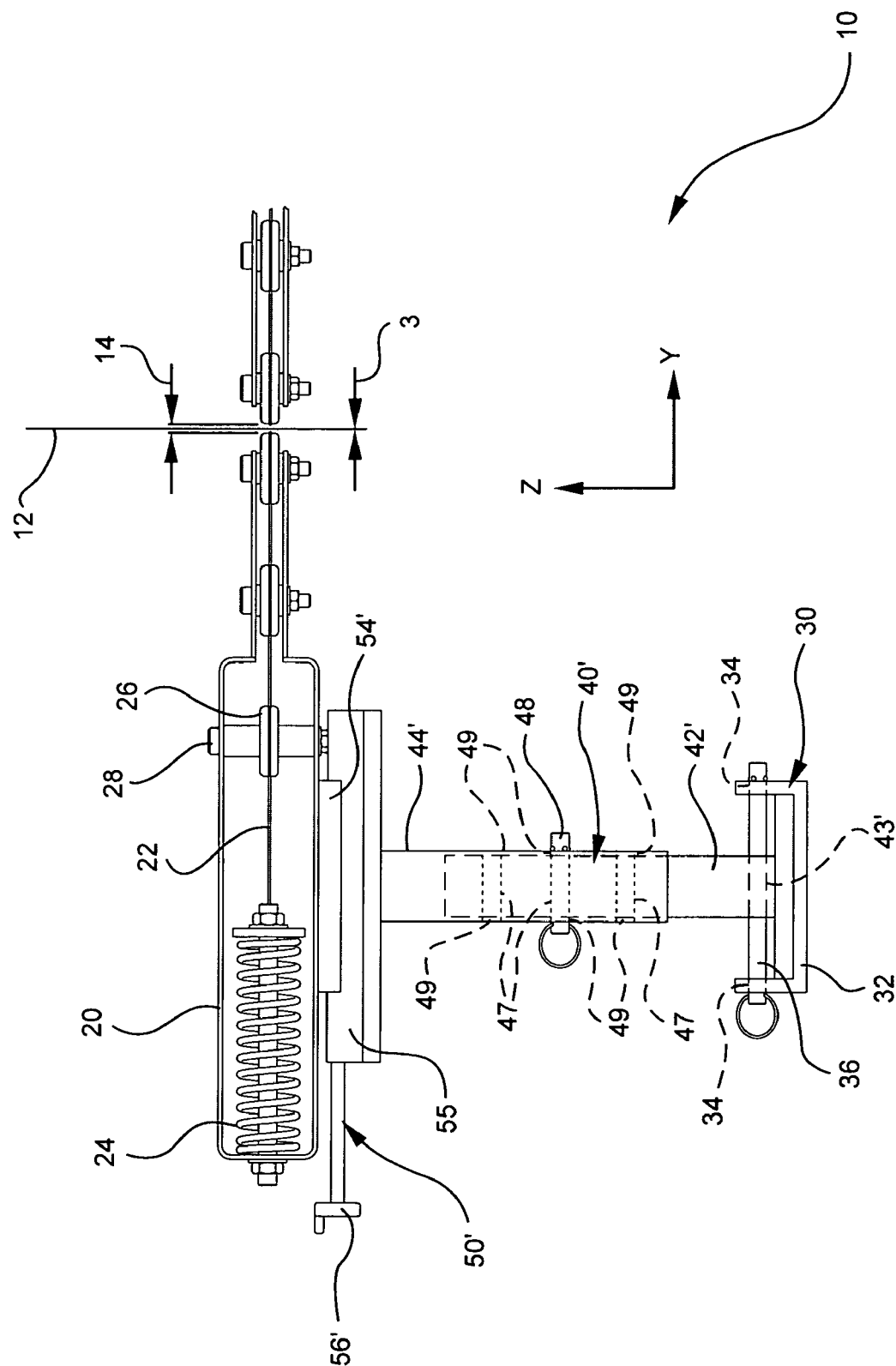
FIG. 5 is a side view of a holder according to the embodiment of FIG. 4.

FIGS. 4 and 5 show a second embodiment of the glass sheet guidance system. In this embodiment, reference numerals similar to those used in describing the first embodiment denote similar parts, and the description here focuses on the differences from the first embodiment.

On each side of a glass sheet 12, traveling along a conveyance path, there is disposed a plurality of holders 10'. A first set of holders 10' is disposed on one side of the glass sheet 12, and a guidance member 22 is coupled between them so as to abut one side of the conveyance path for the glass sheet 12. A second set of holders 10' is disposed on the other side of the glass sheet 12, and another guidance member 22 is coupled between them so as to about a second side of the conveyance path for the glass sheet 12. The first and second sets of holders are disposed so that the guidance members 22 form a gap 14 therebetween in which the glass sheet 12 is guided. The gap 14 defines a width of the conveyance path for the glass sheet 12. The glass sheet 12 has a thickness 3, and the gap 14 is set to be substantially equal to or larger than the thickness 3.

FIG. 5 shows a side view of one holder 10' according to the second embodiment of the glass sheet guidance system. The holder 10' includes a housing 20 that supports the guidance member 22.

In the embodiment of FIGS. 4 and 5, the guidance member 22, tension member 24, and housing 20, are similar to the like elements described above in connection with FIGS. 1-3 and, therefore, their further description is omitted here.

The housing 20 is supported by a floor support 30, a vertical support 40', and a horizontal support 50', so that the housing 20 (and thus the guidance member 22 coupled thereto) can move in three dimensions with respect to the glass sheet 12 and to the floor support 30. Because the guidance member 22 is movable in three dimensions, the position of the guidance member 22 can be adjusted to accommodate glass sheets 12 having different width 1, height 2, and thickness 3.

The floor support 30 is similar to that described above in connection with FIGS. 1-3 and, therefore, further description is omitted here.

Vertical support 40' includes a lower section 42', an upper section 44', and a pin 48 to couple these sections together. The lower section 42' is formed as a post having a hole 43' that can be aligned with the various pairs of holes 34 in the plate 32. Accordingly, the pin 36 can be inserted through one hole 34, through the hole 43', and through another hole 34 to thereby locate the vertical support 40' with respect to the floor support 30, as noted above. Additionally, lower section 42' includes a plurality of holes 47, spaced apart from one another in the z-axis direction. Upper section 44' is a hollow member that fits over lower section 42', and has a plurality of holes 49. The holes 49 on one side (left of FIG. 5, for example) of the upper section 44' are paired with holes 49 on the other side (right of FIG. 5, for example) of the upper section 44' so as to form a straight path in the y-axis direction. The pairs of holes 49 are spaced apart from one another in the z-axis direction. Various pairs of the holes 49 may be aligned with various ones of the holes 47 so that pin 48 may be inserted in the y-axis direction through one hole 49, a hole 47, and a second hole 49, to hold the lower section 42' relative to the upper section 44'. By changing the alignment of the holes 47 with respect to holes 49, as by sliding the upper section 44' and lower section 42' relative to one another, the housing 20 may be disposed at various locations in the z-axis direction. Thus, the holes 47, 49, and pin 48, provide a vertical adjustment mechanism for the housing 20, so as to accommodate glass sheets 12 having different heights 2.

Although lower section 42' is disclosed as including a post and upper section 44' is disclosed as including a hollow member that fits over the post, this arrangement may be reversed. Also, other arrangements are possible.

Horizontal support 50' includes a block 54', a mount 55, and an actuator 56'. The block 54' is fixedly coupled to the housing 20, and is configured to slide along mount 55. The mount 55 is fixedly coupled to the upper section 44' of the vertical support 40'. Actuator 56' is a screw member that is fixed in the y-axis direction with respect to the mount 55, and threadingly engages block 54'. Therefore, by rotating the actuator 56', the block 54' and the housing 20 can be made to move in the y-axis direction toward and away from the glass sheet 12. The actuator 56' is thus a horizontal adjustment mechanism. By moving the housing 20 in the y-axis direction relative to the housing opposite thereto across the gap 14, the size of the gap 14 can be changed so that the glass sheet guidance system can guide glass sheets 12 of different thickness 3.

Similarly to the variation in number and arrangement of holders 10 noted above in connection with the embodiment of FIGS. 1-3, the number and arrangement of the holders 10' may vary. For example, although only two holders 10' are shown as being connected to a guidance member 22, any suitable number of holders 10' may be used in a set connected to one guidance member 22. Also, depending on the distance that the glass sheet 12 is to travel for a given application of the glass sheet guidance system, more than one set of holders 10' may be disposed in series along the x-axis direction on each side of the conveyance path of the glass sheet 12. For example, a third set of holders 10' may be disposed on the same side of the conveyance path of the glass sheet 12 as the first set of holders, and downstream of the first set of holders in the x-axis direction. Additionally, a fourth set of holders 10' may be disposed on the same side of the conveyance path of the glass sheet 12 as the second set of holders, and downstream of the second set of holders in the x-axis direction. Similarly to the first and second sets of holders 10'; the third and fourth sets of holders 10' may be disposed so as to form a gap for guiding the glass sheet 12. Further, any number of sets of holders 10' may be used on one side of the conveyance path of the glass sheet 12. Moreover, the same or a different number of sets of holders 10' may be used on opposite sides of the conveyance path of the glass sheet 12.

Alternatively, a set of holders 10' may be used on only one side of the conveyance path of the glass sheet 12 without a corresponding set of holders 10' on the opposite side of the conveyance path of the glass sheet 12. In such a case, there is no gap associated with that particular set of holders 10'. In this alternative case, the guidance system would resist motion of the glass sheet from one side at the point along the x-axis at which that set of holders is disposed. Further, a number of these sets of holders may be disposed along the x-axis on one side of the conveyance path of the glass sheet. Moreover, a number of these sets of holders (used without a corresponding set of holders so that there is no gap formed) may be used on opposite sides of the conveyance path of the glass sheet at different x-axis positions. For example, one set of these holders (used without a corresponding set of holders so that there is no gap formed) may be used on a first side of the conveyance path of the glass sheet 12 at a first x-axis position. Then, another set of these holders (used without a corresponding set of holders so that there is no gap formed) may be used on a second side of the conveyance path of the glass sheet 12 at a different x-axis position.

The configuration of the holders 10' may also vary. That is, the holders 10' in one set may have the same configuration as one another, or may have different configurations. For example, although the second embodiment shows holders 10' having manual actuators, one holder may have manual actuators, and another holder may have powered actuators. Similarly, although the second embodiment shows only one type of actuator (manual) within one holder 10', a holder may include a mix of powered and manual actuators. Additionally, the holders 10' in one set may have a different configuration than the holders 10' in another set.

The operation of the glass sheet guidance system described in this embodiment is similar to that described in connection with the embodiment of FIGS. 1-3. One difference, however, is that the actuators 46' and 56' of the vertical and horizontal adjustment mechanisms in this embodiment are operated manually instead of being powered. Nonetheless, in a manner similar to that described above in connection with the embodiment of FIGS. 1-3, the position of the guidance member 22 can be changed in three dimensions by action of the longitudinal adjustment mechanism, the vertical adjustment mechanism, and the horizontal adjustment mechanism.

Figure 6:
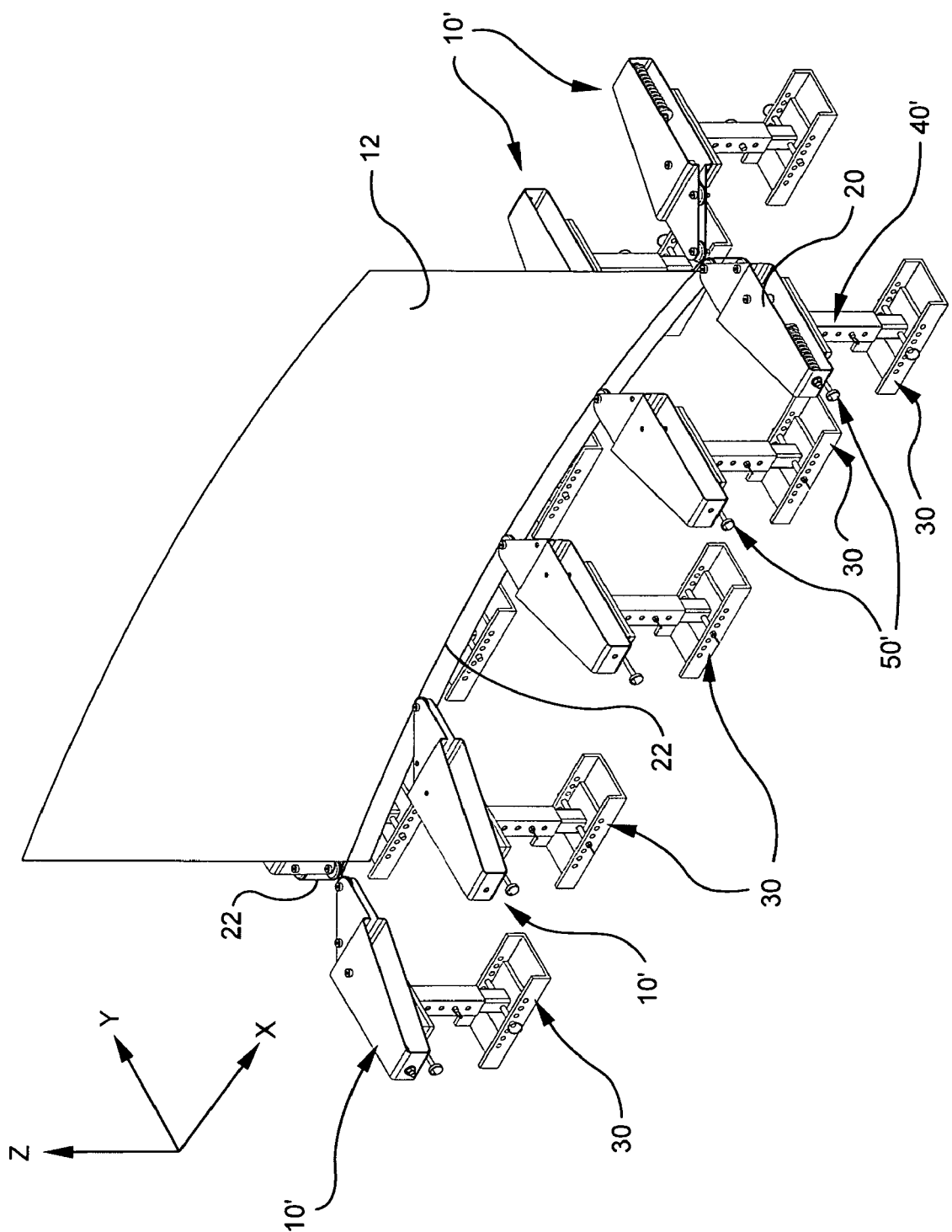
FIG. 6 is as a plan view of a glass sheet guidance system according to a third embodiment.
Figure 7:
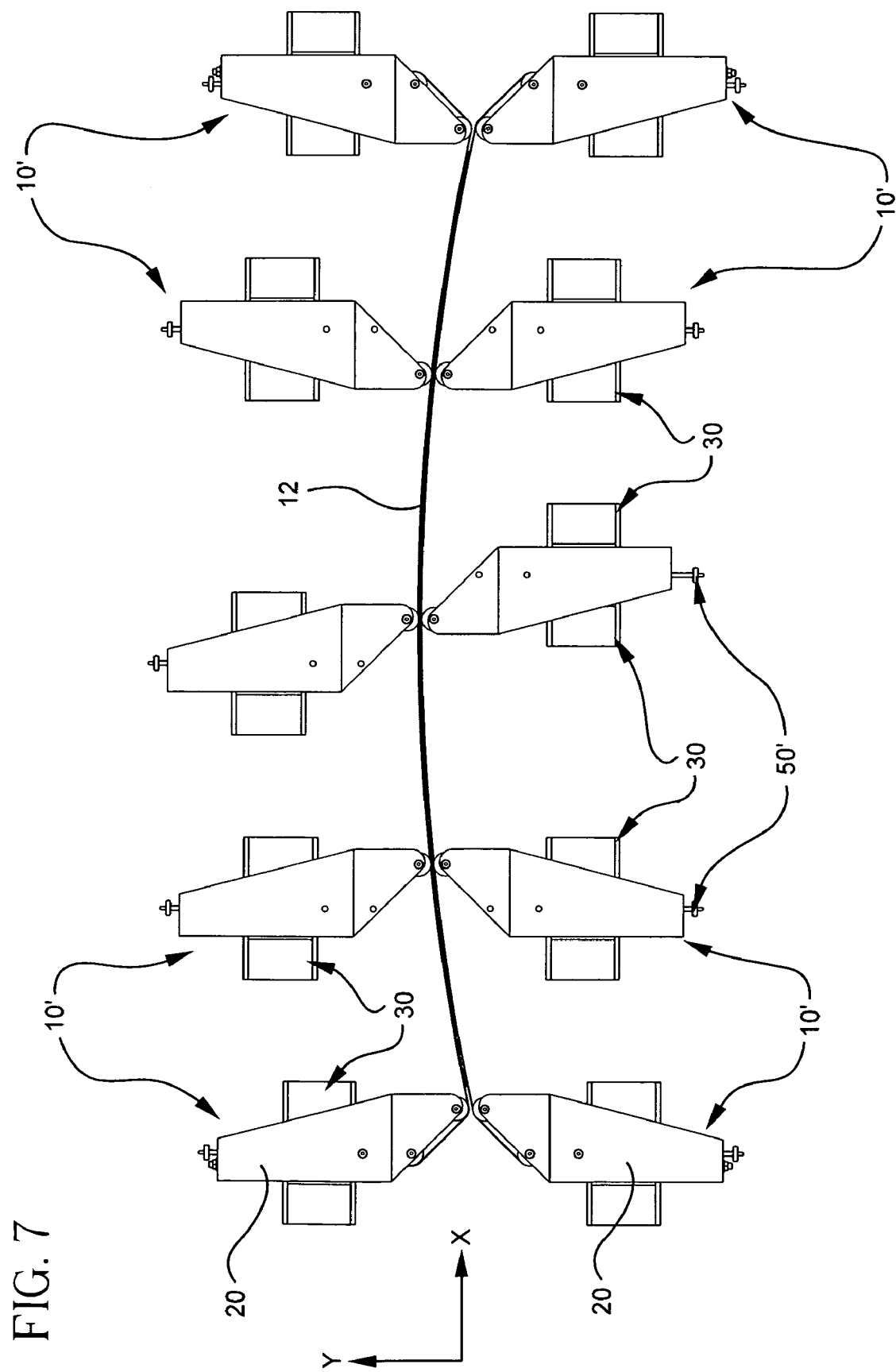
FIG. 7 is a top view of the glass sheet guidance system as shown in FIG. 6.

FIGS. 6 and 7 show a third embodiment of glass sheet guidance system. In this embodiment, reference numerals similar to those used in other embodiments denote like parts, and their description here is omitted. The description here focuses on the differences from the first and second embodiments.

On each side of a glass sheet 12, traveling along a conveyance path in the x-axis direction, there is disposed a plurality of holders 10'. A first set of holders 10' is disposed on one side of the glass sheet 12, and a guidance member 22 is coupled between them to abut one side of the conveyance path. A second set of holders 10' is disposed on the other side of the glass sheet 12, and another guidance member 22 is coupled between them to abut a second side of the conveyance path. The first and second sets of holders are disposed so that the guidance members 22 form a gap 14 therebetween in which the glass sheet 12 is guided. The gap defines the width of the conveyance path. The glass sheet 12 has a thickness 3, and the gap 14 is set to be substantially equal, or slightly larger than, the thickness 3.

In this embodiment, the plurality of holders 10' in one set are displaced relative to one another in the y-axis direction, so that the guidance member 22 follows a curved path. The plurality of holders 10' in the second set also are disposed so as to be displaced relative to one another in the y-axis direction, and so that holders 10' of the two sets, at corresponding x-axis positions, have similar displacements in the y-axis direction so as to maintain gap 14. That is, the holders 10' in the second set are disposed so that the guidance member 22 follows a similar curved path as the guidance member 22 of the first set, but is displaced relative thereto by the gap 14.

By disposing the holders 10' in the above-noted manner, a glass sheet 12 can be guided along a curved path. The glass sheet 12 can be flexible, so that it follows the curved path, or may have a curvature itself. If the glass sheet 12 has a curvature, and is rigid, the holders 10' can be disposed so that the guidance members 22 have a curvature substantially matching that of the glass sheet 12.

In FIGS. 6 and 7, the holders 10' are displaced relative to one another in the direction of the y-axis by different placements of their floor supports 30. Alternatively, a similar effect can be achieved by adjusting the horizontal supports 50'. That is, the guidance member 22 can be made to follow a curved path by disposing the holders 10' in the set so that their floor supports 30 are in the same y-axis location, but so that their horizontal supports 50' are adjusted to vary the y-axis locations of their housings 20.

Any number of holders 10' may be used in one set in order to obtain the desired curvature of the guidance members 22. In general, more holders 10' may be used to achieve a tighter radius of curvature.

Similarly to the variation in arrangement noted above in connection with the embodiment of FIGS. 1-3, the arrangement of the holders 10' in this embodiment may vary. For example, depending on the distance that the glass sheet 12 is to travel for a given application of the glass sheet guidance system, more than one set of holders 10' may be disposed in series along the x-axis direction on each side of the conveyance path of the glass sheet 12. For example, a third set of holders 10' may be disposed on the same side of the conveyance path of the glass sheet 12 as the first set of holders, and downstream of the first set of holders in the x-axis direction. Additionally, a fourth set of holders 10' may be disposed on the same side of the conveyance path of the glass sheet 12 as the second set of holders, and downstream of the second set of holders in the x-axis direction. Similarly to the first and second sets of holders 10'; the third and fourth sets of holders 10' may be disposed so as to form a gap for guiding the glass sheet 12. The gap 14 defining the width of the conveyance path. Further, any number of sets of holders 10' may be used on one side of the conveyance path of the glass sheet 12. Moreover, the same or a different number of sets of holders 10' may be used on opposite sides of the conveyance path of the glass sheet 12.

Alternatively, a set of holders 10' may be used on only one side of the conveyance path of the glass sheet 12 without a corresponding set of holders 10' on the opposite side of the conveyance path of the glass sheet 12. In such a case, there is no gap associated with that particular set of holders 10'. In this alternative case, the guidance system would resist motion of the glass sheet from one side at the point along the x-axis at which that set of holders is disposed. Further, a number of these sets of holders may be disposed along the x-axis on one side of the conveyance path of the glass sheet. Moreover, a number of these sets of holders (used without a corresponding set of holders so that there is no gap formed) may be used on opposite sides of the conveyance path of the glass sheet at different x-axis positions. For example, one set of these holders (used without a corresponding set of holders so that there is no gap formed) may be used on a first side of the conveyance path of the glass sheet 12 at a first x-axis position. Then, another set of these holders (used without a corresponding set of holders so that there is no gap formed) may be used on a second side of the conveyance path of the glass sheet 12 at a different x-axis position.

The configuration of the holders 10' may also vary. The holders 10' in one set may have the same configuration as one another, or may have different configurations. For example, although the third embodiment shows holders 10' having manual actuators, one holder may have manual actuators, and another holder may have powered actuators. Similarly, although the third embodiment shows only one type of actuator (manual) within one holder 10', a holder may include a mix of powered and manual actuators. Alternatively, any or all of the holders may be configured as the holders 10 of the first embodiment, or may include only powered actuators.

Figure 8:
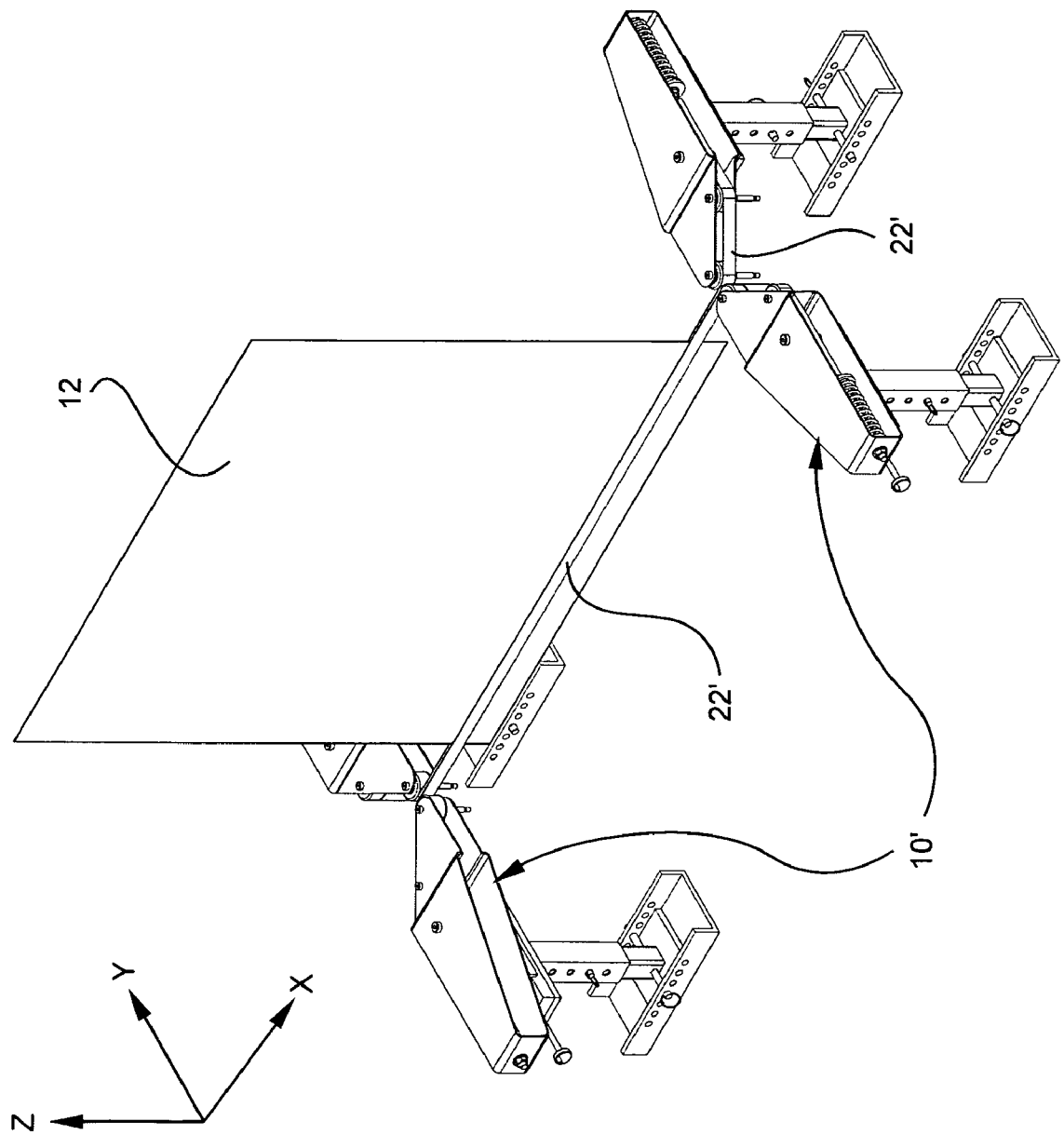
FIG. 8 is plan view of a glass sheet guidance system having a guidance member according to a alternative embodiment.
Figure 9:
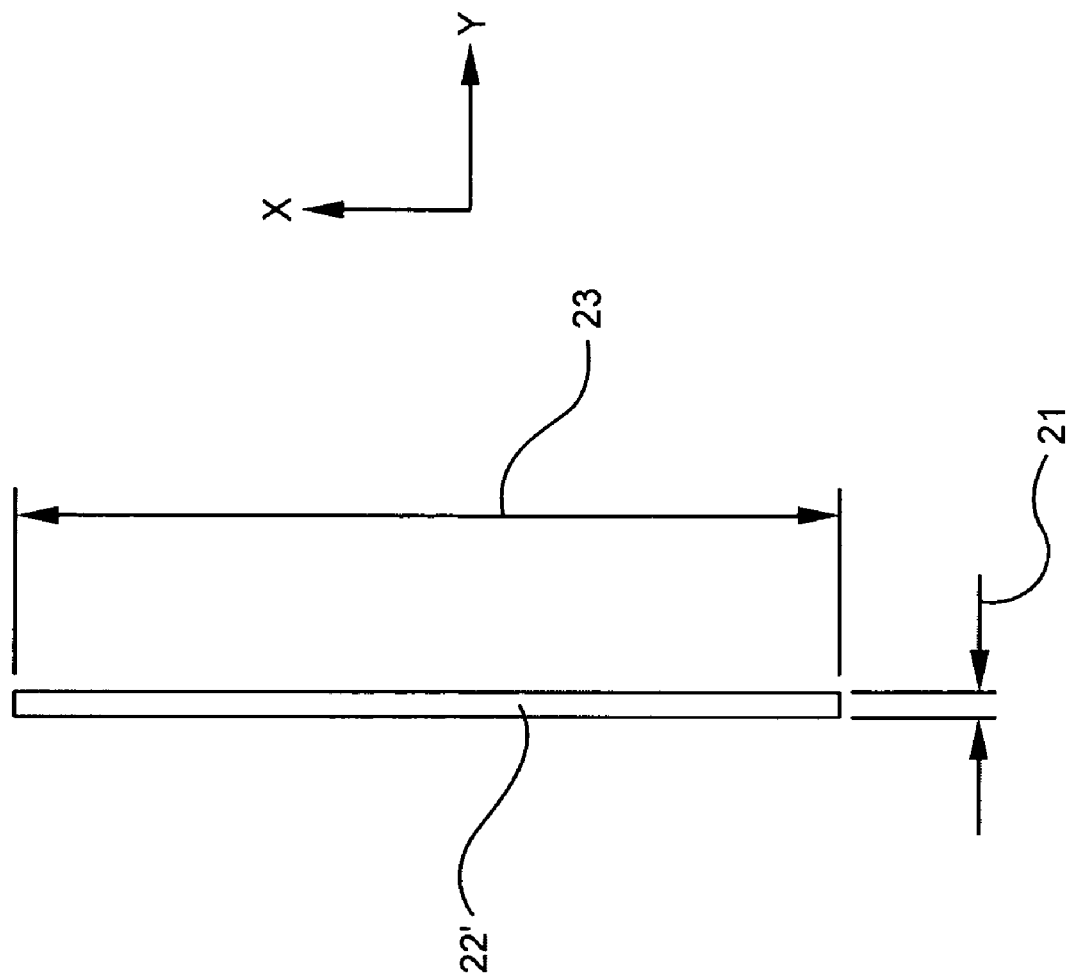
FIG. 9 is a cross-sectional view of the guidance member of FIG. 8.

FIGS. 8 and 9 show an alternative embodiment of the guidance member. In this embodiment, reference numerals similar to those used in the other embodiments denote like parts, and their description is omitted here. The description here focuses on the differences from the previous embodiments.

On each side of a glass sheet 12, traveling along a conveyance path in the x-axis direction, there is disposed a plurality of holders 10'. A first set of holders 10' is disposed on one side of the glass sheet 12, and a guidance member 22' is coupled between them to abut one side of the conveyance path. A second set of holders 10' is disposed on the other side of the glass sheet 12, and another guidance member 22' is coupled between them to abut a second side of the conveyance path. The first and second sets of holders are disposed so that the guidance members 22' form a gap 14 therebetween in which the glass sheet 12 is guided. The gap defines the width of the conveyance path. The glass sheet 12 has a thickness 3, and the gap 14 is set to be substantially equal to or larger than the thickness 3.

In this embodiment, the guidance member 22' is a thin flat ribbon member, having a thickness 21, and a height 23, as shown in FIG. 9. The thickness 21 is less than the height 23, so that the guidance member 22' forms a thin flat ribbon member having a relatively small contact area with a surface of the glass sheet 12. The guidance member 22' may be made of tempered spring steel for example, however, the material is not particularly restricted. Instead, as with guidance member 22, the material from which the guidance member 22' is made may vary depending on the application of the glass sheet guidance system. That is, if the glass sheet 12 to be guided is at a high temperature, then the guidance member 22' can be made of a heat resistant material. The guidance member 22' may be metal or non-metal, it may have a coating or not. Alternatively, or in addition thereto, the material can be chosen so as not to damage the surface of the glass sheet. Lastly, the guidance member 22' should remain constant in cross-sectional shape in high temperature environments.

The position, number, and configuration of the sets of holders 10' (including the configuration of the individual holders within a set), including variations thereof, can be the same as that described above with respect to the embodiment of FIGS. 4 and 5. Therefore, the particular details of the position, number, and configuration of the sets of holders (including the configuration of the individual holders within a set), including the variations thereof, are not set forth here.

It should be emphasized that the above-described embodiments of the present invention, particularly any "preferred" embodiments, are merely possible examples of implementations, merely set forth for a clear understanding of principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

For example, although the width adjustment is shown as being manual, a powered actuator may be disposed between the floor support and the vertical support, and so as to provide automatic width adjustment.

Additionally, for example, while specific configurations of manual adjustment mechanisms have been disclosed, any of the manual adjustment mechanisms may include variations such as an adjusting knob and lock pin, set screw and slide arrangement, a slide and locking arrangement, a crank screw mounted to a slide, an adjusting screw mounted to a dovetail slide.

Further, for example, although shown as guiding a glass sheet in a vertical orientation, the sheet guidance system disclosed herein could be used to guide a horizontally oriented glass sheet.

Moreover, although the guidance member is described as being coupled to the holders so that the glass sheet moves relative to the guidance member, the guidance member may be arranged differently. For example, the guidance member may be provided as an endless loop, coupled to the holders so that when in contact with the glass sheet, the guidance member moves along with the glass sheet as the glass sheet is conveyed. In such an arrangement, the guidance member may be made to circulate around a pulley in one holder of a set, and then extend to another pulley in another holder of the set, without contacting the glass sheet, so as to re-circulate. In such an arrangement of the guidance member, the tension member may be coupled to one of the pulleys around which the guidance member circulates so as to move the position of that pulley and thereby compensate for any change in length of the guidance member.

What is claimed is:

1. A glass sheet guidance system comprising:
a conveyance path along which the glass sheet travels;
a guidance member;
a first holder; and
a second holder,
wherein the guidance member is coupled to the first holder and the second holder so that the guidance member is taut, is movable in three dimensions while remaining taut, and abuts the conveyance path.

2. The system according to claim 1, wherein the guidance member is coupled to the first holder by a tension member.

3. The system according to claim 2, wherein the tension member is a spring.

4. The system according to claim 1, wherein the guidance member comprises a wire, a cable, or a ribbon member.

5. The system according to claim 1, further comprising a third holder coupled to the guidance member and disposed between the first holder and the second holder, wherein the third holder is positioned relative to the first holder and the second holder so that the guidance member forms a curve.

6. The system according to claim 1, further comprising:
a second guidance member;
a third holder; and
a fourth holder,
wherein the second guidance member is coupled to the third holder and the fourth holder so that the second guidance member is taut, is movable in three dimensions, and abuts the conveyance path, and
wherein the second guidance member is opposed to the first guidance member so as to define a gap.

7. A glass sheet guidance system comprising:
a conveyance path along which the glass sheet travels;
a guidance member;
a first holder; and
a second holder,
wherein the guidance member is coupled to the first holder and the second holder so that the guidance member is taut, is movable in three dimensions, and abuts the conveyance path, and wherein the first holder further comprises:
a first housing coupled to the guidance member;
a longitudinal adjustment mechanism coupled to the first housing so as to dispose the first housing in different positions in a longitudinal direction of the conveyance path thereby making the guidance member movable in a first of the three dimensions;
a vertical adjustment mechanism coupled to the first housing so as to dispose the first housing in different positions in a vertical direction, wherein the vertical direction is substantially perpendicular to the longitudinal direction thereby making the guidance member movable in a second of the three dimensions; and
a horizontal adjustment mechanism coupled to the first housing so as to dispose the first housing in different positions in a horizontal direction, wherein the horizontal direction is substantially perpendicular to the vertical direction and the longitudinal direction thereby making the guidance member movable in a third of the three dimensions.

8. The system according to claim 7, wherein the guidance member is coupled to the first holder by a tension member.

9. The system according to claim 7, wherein the horizontal adjustment mechanism is a powered adjustment mechanism.

10. The system according to claim 9, wherein the first holder further comprises a sensor for determining a horizontal position of the first housing and outputting a signal based on the horizontal position, the system further comprising a controller coupled to the sensor and to the horizontal adjustment mechanism, whereby the controller adjusts the horizontal position of the housing by outputting a signal to the horizontal adjustment mechanism, wherein the signal output from the controller is based on the signal output from the sensor.

11. The system according to claim 7, wherein the horizontal adjustment mechanism is a linear force actuator, the system further comprising a controller coupled to the linear force actuator so as to cause the linear force actuator to maintain a constant position of, or apply a constant force to, the first housing.

12. The system according to claim 7, further comprising:
a second guidance member;
a third holder; and
a fourth holder,
wherein the second guidance member is coupled to the third holder and the fourth holder so that the second guidance member is taut, is movable in three dimensions, and abuts the conveyance path, and
wherein the second guidance member is opposed to the first guidance member so as to define a gap.

13. The system according to claim 12, wherein the third holder further comprises:
a second housing coupled to the second guidance member;
a second longitudinal adjustment mechanism coupled to the second housing so as to dispose the second housing in different positions in the longitudinal direction thereby making the second guidance member movable in a first of the three dimensions;
a second vertical adjustment mechanism coupled to the second housing so as to dispose the second housing in different positions in the vertical direction thereby making the second guidance member movable in a second of the three dimensions; and
a second horizontal adjustment mechanism coupled to the second housing so as to dispose the second housing in different positions in the horizontal direction thereby making the second guidance member movable in a third of the three dimensions.

14. A method of guiding a glass sheet comprising:
providing a first holder, a second holder, and a guidance member, wherein the guidance member is coupled to the first holder and to the second holder so that the guidance member is taut and movable in three dimensions while remaining taut;
abutting a glass sheet to the guidance member; and
moving the glass sheet.

15. The method according to claim 14, wherein the guidance member is a wire, a cable, or a ribbon member.

16. The method of claim 15, wherein the guidance member is coupled to the first holder by a tension member.

17. The method of claim 14, further comprising:
providing a third holder, a fourth holder, and a second guidance member, wherein the second guidance member is coupled to the third holder and to the fourth holder so that the second guidance member is taut and movable in three dimensions while remaining taut, wherein the second guidance member is opposed to the first guidance member so as to define a gap; and
moving the glass sheet through the gap.

18. The method of claim 17, further comprising:
providing a fifth holder coupled to the second guidance member so that the second guidance member forms a curve;
providing a sixth holder coupled to the guidance member so that the guidance member forms a curve; and
passing the glass sheet through the gap so as to follow the curves of the guidance member and of the second guidance member.

19. The method of claim 14, further comprising adjusting the first holder so as to push the guidance member into contact with the glass sheet and to maintain a constant force on the glass sheet.

\* \* \* \* \*